US008384667B2

(12) United States Patent
Chang

(10) Patent No.: US 8,384,667 B2
(45) Date of Patent: Feb. 26, 2013

(54) GESTURE RECOGNITION INPUT DEVICE

(75) Inventor: Jen-Tsorng Chang, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 349 days.

(21) Appl. No.: 12/766,906

(22) Filed: Apr. 25, 2010

(65) Prior Publication Data

US 2011/0157016 A1 Jun. 30, 2011

(30) Foreign Application Priority Data

Dec. 28, 2009 (CN) .......................... 2009 1 0312344

(51) Int. Cl.
*G06F 3/033* (2006.01)
*G09G 5/08* (2006.01)

(52) U.S. Cl. ........................ 345/158; 345/156; 345/157

(58) Field of Classification Search .......... 345/156–172; 715/700

See application file for complete search history.

(56) References Cited

U.S. PATENT DOCUMENTS

2009/0033623 A1* 2/2009 Lin ................................ 345/158

* cited by examiner

*Primary Examiner* — Kevin M Nguyen
*Assistant Examiner* — Kenneth B Lee, Jr.
(74) *Attorney, Agent, or Firm* — Altis Law Group, Inc.

(57) ABSTRACT

A gesture recognition based input device includes a number of finger wear components and image capture modules, and an image capture module. Each finger wear component dedicatedly reflects light of a unique wavelength. Each image capture module dedicatedly picks up light reflected by a corresponding finger wear component and thereby dedicatedly captures images of the corresponding finger wear component. The image recognition module recognizes movements of the finger wear components from the images and interprets the movements of the finger wear components into control signals.

8 Claims, 3 Drawing Sheets

GESTURE RECOGNITION INPUT DEVICE

BACKGROUND

1. Technical Field

The present disclosure relates to input devices and, particularly, to an input device facilitating gesture recognition.

2. Description of Related Art

Most gesture recognition based input devices include a handheld emitter and a receiver. In use, the receiver is connected to an electronic device. The emitter is held and manipulated by a user. The receiver receives the signals from the emitter, recognizes a movement of the hand (i.e., the gesture), and interprets the movement of the hand as a control signal for the electronic device. However, such input devices cannot recognize movements of fingers (i.e., complicated gestures) which may be useful for more complicated control.

Therefore, it is desirable to provide an input device, which can overcome the above-mentioned limitations.

BRIEF DESCRIPTION OF THE DRAWINGS

Many aspects of the present input device should be better understood with reference to the following drawings. The components in the drawings are not necessarily drawn to scale, the emphasis instead being placed upon clearly illustrating the principles of the present input device. Moreover, in the drawings, like reference numerals designate corresponding parts throughout the several views.

DETAILED DESCRIPTION

Embodiments of the present input device will now be described in detail with reference to the drawings.

Figure 1:
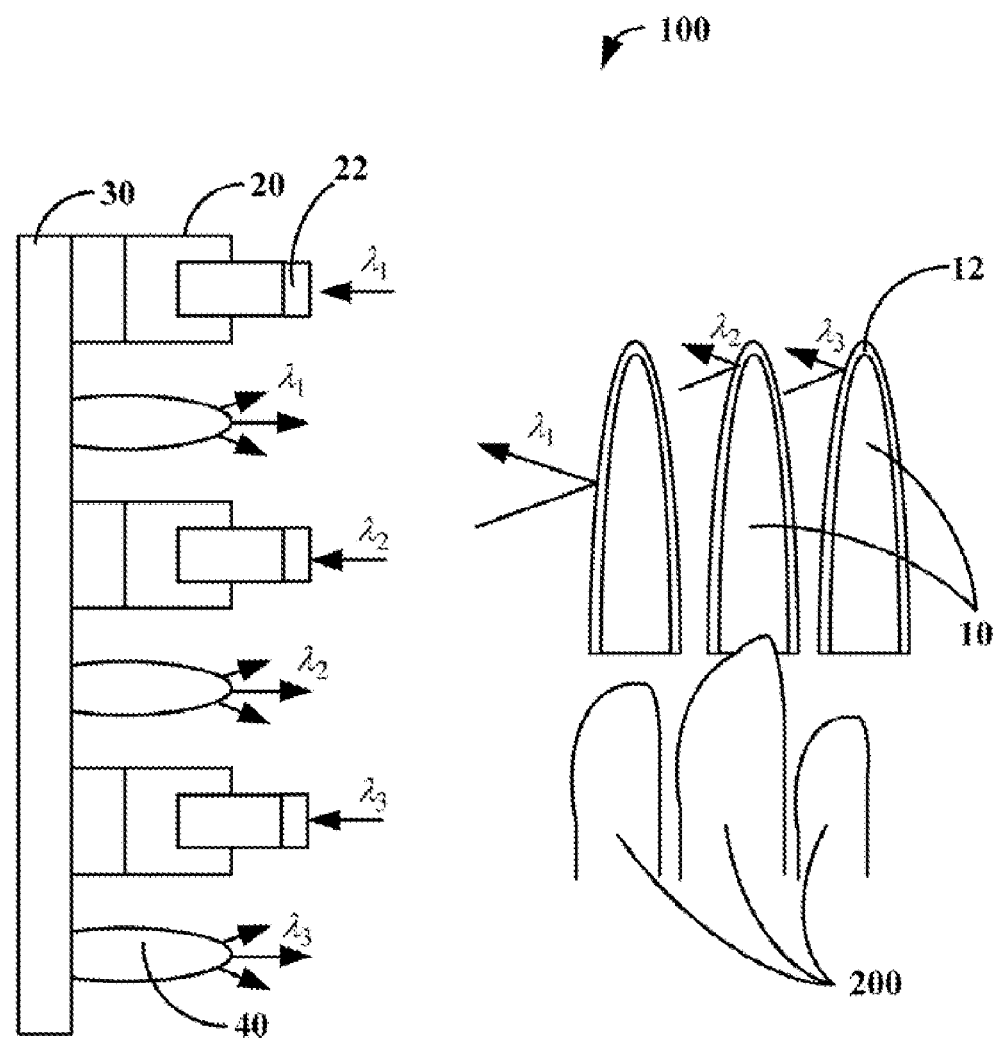
FIG. 1 is a schematic view of an input device, according to one embodiment.

Referring to FIG. 1, an input device 100 facilitating gesture recognition, according to one embodiment, includes three finger mounted components 10, three image capture modules 20, and an image recognition module 30. Each of the finger components 10 includes an outermost reflective film 12. Each of the reflective films 12 is dedicated to reflect light of a unique wavelength λn (n=1, 2, 3). Each of the image capture modules 20 includes a filter 22 disposed at a frontend of an optical imaging path thereof. Each of the filters 22 only allows light of the specific wavelength λn reflected by a corresponding one of the reflective films 12 to pass therethrough. As such, each of the image capture modules 20 can only capture images of the corresponding finger component 10. The image recognition module 30 analyzes images of the finger components 10 formed by the image capture modules 20, recognizes movements of the finger components 10, and interprets the movements as control signals for electronic devices to which the input device 10 is applied.

In use, the finger components 10 are worn on three fingers 200 and move along with the three fingers 200 respectively. As such, the input device 10 can recognize movements of the fingers 200 and interpret the movements as control signals.

Figure 2:
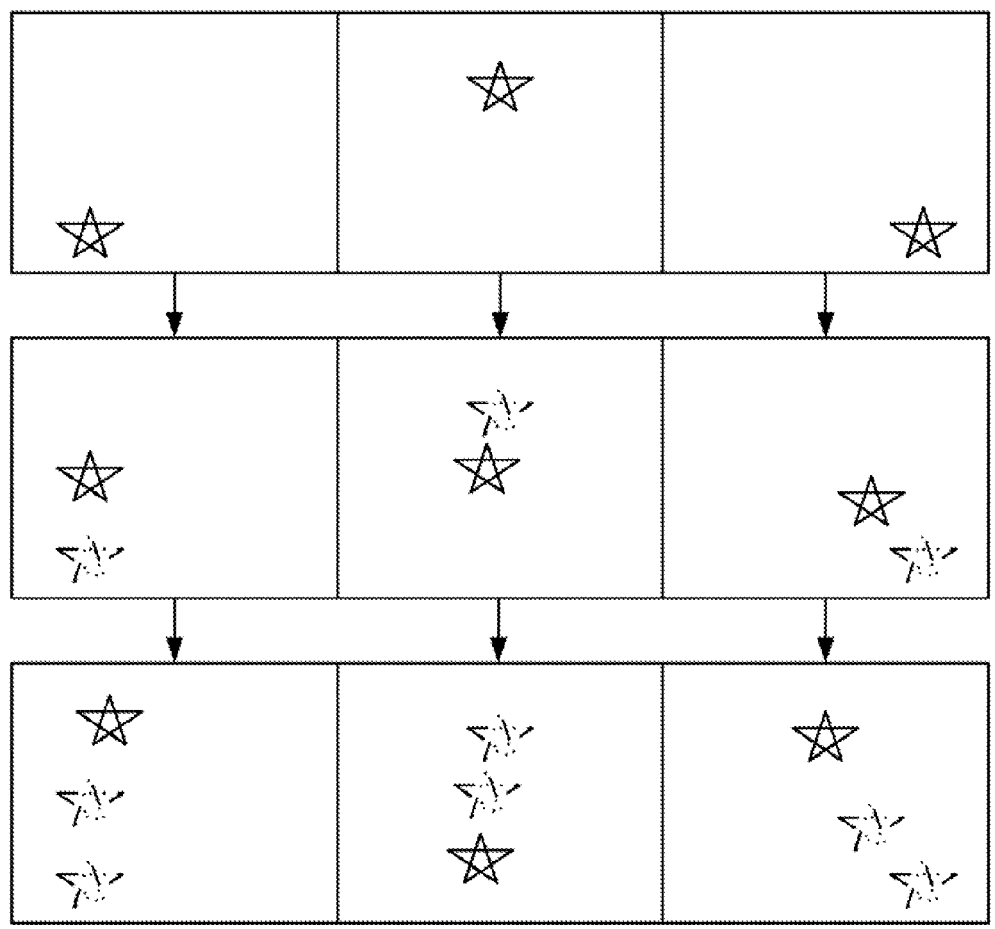
FIG. 2 is a schematic view showing images captured by image capture modules of the input device of FIG. 1.

For example, as shown in FIG. 2, each of the image capture modules 20 captures three consecutive images of the corresponding finger component 10. In each image, a solid line five-pointed star denotes a current position of the corresponding finger component 10 and a dashed line five-pointed star represents a previous position of the corresponding finger component 10. As such, the image recognition module 30 can recognize from the images that the left finger moves mainly upwards and slightly rightwards; the middle finger moves mainly downwards and slightly leftwards; and the right finger moves downwards and rightwards.

Since only light of the wavelength reflected by a finger component 10 can pass through the corresponding filter 22, the finger component 10 in a corresponding image will be much brighter than other portions of the image. As such, it is easy for the image recognition module 30 to recognize the finger component 10 in the image by brightness comparison.

The finger components 10 can be worn directly, increasing convenience of input, as compared to handheld elements.

In addition, light of wavelength λn can be extracted (reflected) by the reflective films 12 directly from ambient light and modulated into the control signals. As such, it is unnecessary to employ a light generating device (i.e., a light emitter) which is required in conventional input devices. This can simplify and reduce cost of the input device 10.

To increase precision and efficiency if needed for particular environments, the input device 10 can further employ three light emitters 40. The emitters 40 emit light of wavelengths λn (n=1, 2, 3) respectively. As such, brightness of the finger components 10 in the images is enhanced and thus the finger components 10 can be easily recognized in environments that may, for example, have little ambient light.

The finger components 10 can be cots, rings or the like. The image capture modules 20 can be camera modules. The image recognition module 30 can be a printed circuit board that has circuits for performing image recognition functions or includes software modules which when executed can analyze and recognize images. In use, the three image capture modules 20 are arranged in a line. The emitters 40 are light-emitting diodes and are alternately arranged with the image capture modules 20.

The numbers of the finger components 10, the image capture modules 20, and the emitters 40 are not limited to three but can be set depending on requirements. However, no matter what number of finger components 10, image capture modules 20, and emitters 40 are employed, wavelengths of light reflected by the employed finger components 10, the image capture modules 20, and the emitters 40 working on should be different from each other (i.e., each is unique).

Figure 3:
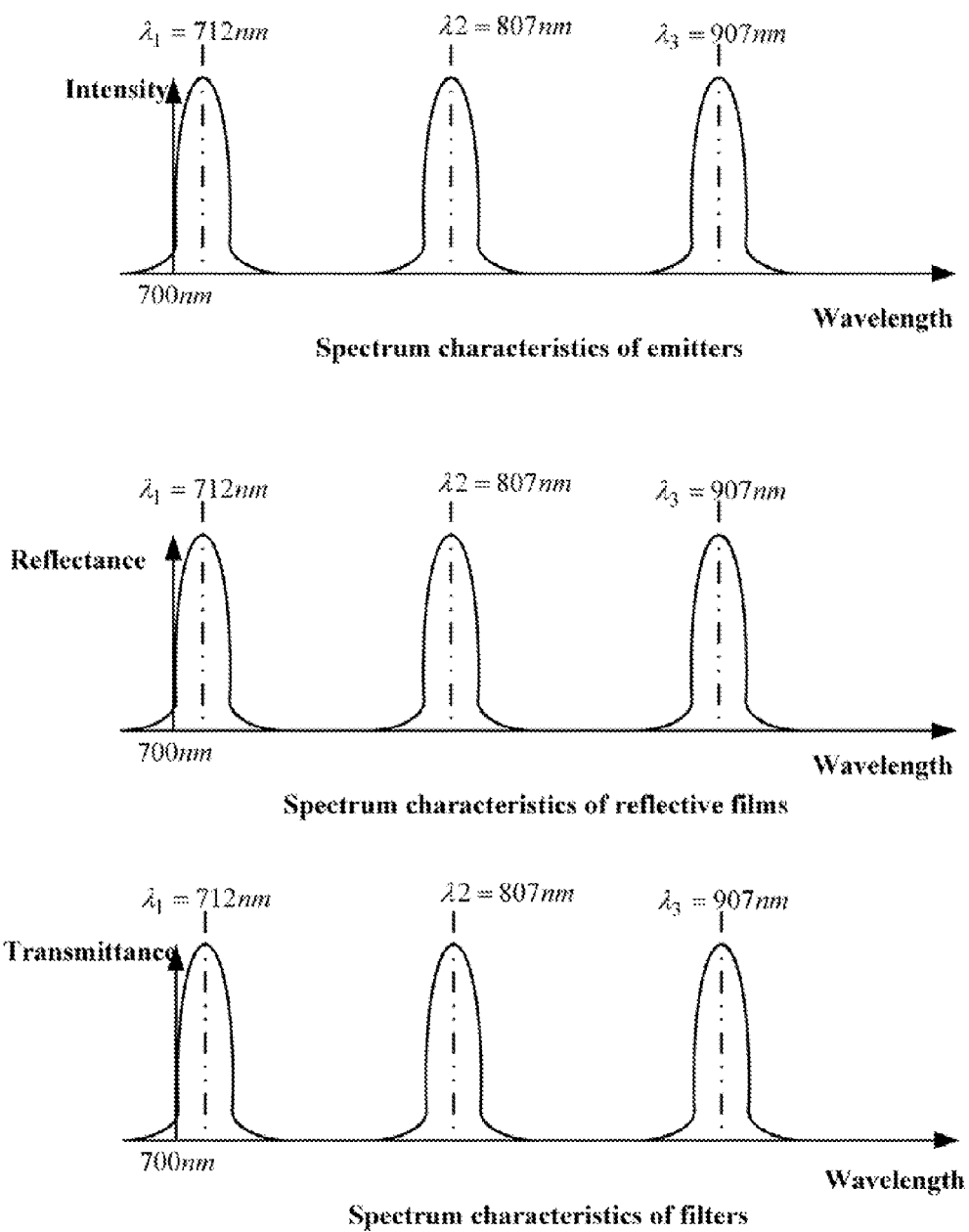
FIG. 3 are graphs showing spectrum characteristics of emitters, reflective films, and filters of the input device of FIG. 1, respectively.

As an example, spectrum characteristics of the emitters 40, the reflective films 12, and the filters 22 are shown in FIG. 3, respectively, wherein $\lambda_1$=712 nm (band: 700~724 nm) $\lambda_2$=807 nm (band: 795~829 nm); $\lambda_3$=907 nm (band: 895~929 nm). That is, the input device 10 is working in infrared. This can prevent interference to the input device 10 by visible light.

It will be understood that the above particular embodiments and methods are shown and described by way of illustration only. The principles and the features of the present disclosure may be employed in various and numerous embodiment thereof without departing from the scope of the disclosure as claimed. The above-described embodiments illustrate the scope of the disclosure but do not restrict the scope of the disclosure.

What is claimed is:

1. An input device comprising:
a first light emitter for emitting a first light of a first wavelength;
a second light emitter for emitting a second light of a second wavelength;

a first finger component for being worn on a finger, configured to dedicatedly reflect the first light;

a second finger component for being worn on a finger, configured to dedicatedly reflect the second light;

a first image capture module sensible to the first light reflected by the first finger component but insensible to the second light, and configured to capture images of the first finger component;

a second image capture module sensible to the second light reflected by the second finger component but insensible to the first light, and configured to capture images of the second finger component; and an image recognition module configured to determine movement traces of the first and second finger components based on the images of the first and second finger components;

wherein the first and second finger components are separated from and move independently in relation to the first and second light emitters.

2. The input device of claim 1, wherein the first finger component comprises an outermost reflective film to reflect the first light, and the second finger component comprises an outermost reflective film to reflect the second light.

3. The input device of claim 1, wherein the finger components are selected from a group consisting of cots and rings.

4. The input device of claim 1, wherein the first image capture device comprises a filter for allowing the first light to pass therethrough, and the second image capture device comprises a filter for allowing the second light to pass therethrough.

5. The input device of claim 1, wherein the image capture devices are camera modules.

6. The input device of claim 1, wherein the light emitters are light-emitting diodes.

7. The input device of claim 1, wherein the first and second lights are infrared lights.

8. The input device of claim 2, wherein the first and second finger components are cots, and the reflective films are formed on an outer surface of the respective cots.

* * * * *